United States Patent
Bohnsack et al.

(10) Patent No.: US 9,009,155 B2
(45) Date of Patent: Apr. 14, 2015

(54) PARALLEL SET AGGREGATION

(71) Applicants: Nico Bohnsack, Ingersleben (DE); Kai Stammerjohann, Wiesloch (DE); Frederik Transier, Heidelberg (DE)

(72) Inventors: Nico Bohnsack, Ingersleben (DE); Kai Stammerjohann, Wiesloch (DE); Frederik Transier, Heidelberg (DE)

(73) Assignee: SAP SE, Walldorf (DE)

( * ) Notice: Subject to any disclaimer, the term of this patent is extended or adjusted under 35 U.S.C. 154(b) by 26 days.

(21) Appl. No.: 13/651,718

(22) Filed: Oct. 15, 2012

(65) Prior Publication Data

US 2013/0290327 A1    Oct. 31, 2013

Related U.S. Application Data

(60) Provisional application No. 61/639,251, filed on Apr. 27, 2012.

(51) Int. Cl.
*G06F 17/30* (2006.01)

(52) U.S. Cl.
CPC .... *G06F 17/30864* (2013.01); *G06F 17/30867* (2013.01); *G06F 17/30286* (2013.01)

(58) Field of Classification Search
CPC .......... G06F 17/3053; G06F 17/30657; G06F 17/30389; G06F 17/30477; G06F 17/30445; G06F 17/30427; G06F 17/30412; G06F 17/30876; G06F 17/30917; G06F 17/30463; G06F 17/30067; G06F 17/30091; G06F 17/30286; G06F 17/30864
USPC ................... 707/736, 758; 711/147
See application file for complete search history.

(56) References Cited

U.S. PATENT DOCUMENTS

| | | | | |
|---|---|---|---|---|
| 7,251,650 B2 * | 7/2007 | Jin | ...... | 707/4 |
| 7,693,819 B2 * | 4/2010 | Stoychev | ...... | 707/2 |
| 8,051,127 B2 * | 11/2011 | Plamondon | ...... | 709/203 |
| 2004/0172400 A1 * | 9/2004 | Zarom et al. | ...... | 707/100 |
| 2009/0106298 A1 * | 4/2009 | Furusho | ...... | 707/102 |
| 2010/0299316 A1 * | 11/2010 | Faerber et al. | ...... | 707/693 |
| 2011/0208947 A1 * | 8/2011 | Lin et al. | ...... | 712/28 |

OTHER PUBLICATIONS

Basu, Kanad et al., "Efficient Trace Data Compression using Statically Selected Dictionary", 2011, 29th IEEE VLSI Test Symposium (VTS), May 1, 2011, XP031880363, DOI: 10.1109/VTS.2011.5783748, ISBN: 978-1-61284-657-6 (pp. 14-19, 6pgs. total).

(Continued)

*Primary Examiner* — Shahid Alam
*Assistant Examiner* — Andalib Lodhi
(74) *Attorney, Agent, or Firm* — Buckley, Maschoff & Talwalkar LLC

(57) ABSTRACT

A system, method and medium may provide determination of a first plurality of a plurality of data records assigned to a first processing unit, identification of a first record of the first plurality of data records, the first record associated with a first key value, generation of a first dictionary entry of a first dictionary for the first key value, storage of a first identifier of the first record as a tail identifier and as a head identifier in the first dictionary entry, storage an end flag in a first shared memory location, the first shared memory location associated with the first record, identification of a second record of the first plurality of data records, the second record associated with the first key value, replacement of the tail identifier in the first dictionary entry with a second identifier of the second record, and storage of the first identifier in a second shared memory location, the second shared memory location associated with the second record.

16 Claims, 13 Drawing Sheets

(56) References Cited

OTHER PUBLICATIONS

Zhang, Hailing et al., "Middleware Design for Integrating Relational Database and NOSQL Based on Data Dictionary", Transportation, Mechanical, and Electrical Engineering (TMEE), 2011 International Conference on, IEEE, Dec. 16, 2011, XP032181092, DOI: 10.1109/TMEE.2011.6199485, ISBN: 978-11-4577-1700-0, (pp. 1469-1472, 4pgs total).

"Communication: European Search Report", European Patent Office, dated Feb. 9, 2013, for European Application No. 13002147.0-1507, 7pgs.

* cited by examiner

200↘

| Date | License plate | Volume [l] | Mileage [miles] |
|---|---|---|---|
| 2011-01-04 | HD-LIC 1 | 48 | 3100 |
| 2011-01-06 | HD-LIC 7 | 50 | 3200 |
| 2011-01-07 | HD-LIC 3 | 51 | 3100 |
| 2011-01-10 | HD-LIC 4 | 49 | 3200 |
| 2011-01-25 | HD-LIC 1 | 47 | 3612 |
| 2011-01-26 | HD-LIC 3 | 50 | 3709 |
| 2011-01-26 | HD-LIC 4 | 52 | 3599 |
| 2011-01-27 | HD-LIC 7 | 51 | 3780 |
| 2011-02-03 | HD-LIC 7 | 49 | 4300 |
| 2011-02-04 | HD-LIC 1 | 48 | 4130 |
| 2011-02-06 | HD-LIC 4 | 50 | 3699 |
| 2011-02-07 | HD-LIC 3 | 52 | 4250 |
| 2011-02-21 | HD-LIC 1 | 48 | 4700 |
| 2011-02-23 | HD-LIC 3 | 49 | 4750 |
| 2011-02-24 | HD-LIC 4 | 50 | 4100 |
| 2011-02-24 | HD-LIC 7 | 12 | 4400 |

*FIG. 2*

| | Date | License plate | Volume [l] | Mileage [miles] | | | |
|---|---|---|---|---|---|---|---|
| 210 | 2011-01-04 | HD-LIC 1 | 48 | 3100 | 0 | | -1 |
| | 2011-01-06 | HD-LIC 7 | 50 | 3200 | 1 | | |
| | 2011-01-07 | HD-LIC 3 | 51 | 3100 | 2 | | |
| | 2011-01-10 | HD-LIC 4 | 49 | 3200 | 3 | | |
| 212 | 2011-01-25 | HD-LIC 1 | 47 | 3612 | 4 | | |
| | 2011-01-26 | HD-LIC 3 | 50 | 3709 | 5 | | |
| | 2011-01-26 | HD-LIC 4 | 52 | 3599 | 6 | | |
| | 2011-01-27 | HD-LIC 7 | 51 | 3780 | 7 | | |
| 214 | 2011-02-03 | HD-LIC 7 | 49 | 4300 | 8 | | |
| | 2011-02-04 | HD-LIC 1 | 48 | 4130 | 9 | | |
| | 2011-02-06 | HD-LIC 4 | 50 | 3699 | 10 | | |
| | 2011-02-07 | HD-LIC 3 | 52 | 4250 | 11 | | |
| 216 | 2011-02-21 | HD-LIC 1 | 48 | 4700 | 12 | | |
| | 2011-02-23 | HD-LIC 3 | 49 | 4750 | 13 | | |
| | 2011-02-24 | HD-LIC 4 | 50 | 4100 | 14 | | |
| | 2011-02-24 | HD-LIC 7 | 12 | 4400 | 15 | | |

(Table labeled 200; right column labeled 430)

| Key Value | Head | Tail |
|---|---|---|
| HD-LIC 1 | 0 | 0 |

(410)

| Key Value | Head | Tail |
|---|---|---|
| | | |

| | Date | License plate | Volume [l] | Mileage [miles] | | | |
|---|---|---|---|---|---|---|---|
| 210 { | 2011-01-04 | HD-LIC 1 | 48 | 3100 | 0 | | -1 |
| | 2011-01-06 | HD-LIC 7 | 50 | 3200 | 1 | | -1 |
| | 2011-01-07 | HD-LIC 3 | 51 | 3100 | 2 | | |
| | 2011-01-10 | HD-LIC 4 | 49 | 3200 | 3 | | |
| 212 { | 2011-01-25 | HD-LIC 1 | 47 | 3612 | 4 | | -1 |
| | 2011-01-26 | HD-LIC 3 | 50 | 3709 | 5 | | -1 |
| | 2011-01-26 | HD-LIC 4 | 52 | 3599 | 6 | | |
| | 2011-01-27 | HD-LIC 7 | 51 | 3780 | 7 | | |
| 214 { | 2011-02-03 | HD-LIC 7 | 49 | 4300 | 8 | | |
| | 2011-02-04 | HD-LIC 1 | 48 | 4130 | 9 | | |
| | 2011-02-06 | HD-LIC 4 | 50 | 3699 | 10 | | |
| | 2011-02-07 | HD-LIC 3 | 52 | 4250 | 11 | | |
| 216 { | 2011-02-21 | HD-LIC 1 | 48 | 4700 | 12 | | |
| | 2011-02-23 | HD-LIC 3 | 49 | 4750 | 13 | | |
| | 2011-02-24 | HD-LIC 4 | 50 | 4100 | 14 | | |
| | 2011-02-24 | HD-LIC 7 | 12 | 4400 | 15 | | |

410

| Key Value | Head | Tail |
|---|---|---|
| HD-LIC 1 | 0 | 0 |
| HD-LIC 7 | 1 | 1 |

420

| Key Value | Head | Tail |
|---|---|---|
| HD-LIC 1 | 4 | 4 |
| HD-LIC 3 | 5 | 5 |

FIG. 5

| | Date | License plate | Volume [l] | Mileage [miles] | | |
|---|---|---|---|---|---|---|
| 210 { | 2011-01-04 | HD-LIC 1 | 48 | 3100 | 0 | -1 |
| | 2011-01-06 | HD-LIC 7 | 50 | 3200 | 1 | -1 |
| | 2011-01-07 | HD-LIC 3 | 51 | 3100 | 2 | -1 |
| | 2011-01-10 | HD-LIC 4 | 49 | 3200 | 3 | -1 |
| 212 { | 2011-01-25 | HD-LIC 1 | 47 | 3612 | 4 | -1 |
| | 2011-01-26 | HD-LIC 3 | 50 | 3709 | 5 | -1 |
| | 2011-01-26 | HD-LIC 4 | 52 | 3599 | 6 | -1 |
| | 2011-01-27 | HD-LIC 7 | 51 | 3780 | 7 | -1 |
| 214 { | 2011-02-03 | HD-LIC 7 | 49 | 4300 | 8 | |
| | 2011-02-04 | HD-LIC 1 | 48 | 4130 | 9 | |
| | 2011-02-06 | HD-LIC 4 | 50 | 3699 | 10 | |
| | 2011-02-07 | HD-LIC 3 | 52 | 4250 | 11 | |
| 216 { | 2011-02-21 | HD-LIC 1 | 48 | 4700 | 12 | |
| | 2011-02-23 | HD-LIC 3 | 49 | 4750 | 13 | |
| | 2011-02-24 | HD-LIC 4 | 50 | 4100 | 14 | |
| | 2011-02-24 | HD-LIC 7 | 12 | 4400 | 15 | |

Table 200, column 430.

410

| Key Value | Head | Tail |
|---|---|---|
| HD-LIC 1 | 0 | 0 |
| HD-LIC 7 | 1 | 1 |
| HD-LIC 3 | 2 | 2 |
| HD-LIC 4 | 3 | 3 |

420

| Key Value | Head | Tail |
|---|---|---|
| HD-LIC 1 | 4 | 4 |
| HD-LIC 3 | 5 | 5 |
| HD-LIC 4 | 6 | 6 |
| HD-LIC 7 | 7 | 7 |

*FIG. 6*

| | Date | License plate | Volume [l] ⌐200 | Mileage [miles] | | ⌐430 |
|---|---|---|---|---|---|---|
| 210 | 2011-01-04 | HD-LIC 1 | 48 | 3100 | 0 | -1 |
| | 2011-01-06 | HD-LIC 7 | 50 | 3200 | 1 | -1 |
| | 2011-01-07 | HD-LIC 3 | 51 | 3100 | 2 | -1 |
| | 2011-01-10 | HD-LIC 4 | 49 | 3200 | 3 | -1 |
| 212 | 2011-01-25 | HD-LIC 1 | 47 | 3612 | 4 | -1 |
| | 2011-01-26 | HD-LIC 3 | 50 | 3709 | 5 | -1 |
| | 2011-01-26 | HD-LIC 4 | 52 | 3599 | 6 | -1 |
| | 2011-01-27 | HD-LIC 7 | 51 | 3780 | 7 | -1 |
| 214 | 2011-02-03 | HD-LIC 7 | 49 | 4300 | 8 | 1 |
| | 2011-02-04 | HD-LIC 1 | 48 | 4130 | 9 | |
| | 2011-02-06 | HD-LIC 4 | 50 | 3699 | 10 | |
| | 2011-02-07 | HD-LIC 3 | 52 | 4250 | 11 | |
| 216 | 2011-02-21 | HD-LIC 1 | 48 | 4700 | 12 | 4 |
| | 2011-02-23 | HD-LIC 3 | 49 | 4750 | 13 | |
| | 2011-02-24 | HD-LIC 4 | 50 | 4100 | 14 | |
| | 2011-02-24 | HD-LIC 7 | 12 | 4400 | 15 | |

⌐410

| Key Value | Head | Tail |
|---|---|---|
| HD-LIC 1 | 0 | 0 |
| HD-LIC 7 | 1 | 8 |
| HD-LIC 3 | 2 | 2 |
| HD-LIC 4 | 3 | 3 |

⌐420

| Key Value | Head | Tail |
|---|---|---|
| HD-LIC 1 | 4 | 12 |
| HD-LIC 3 | 5 | 5 |
| HD-LIC 4 | 6 | 6 |
| HD-LIC 7 | 7 | 7 |

*FIG. 7*

|  | Date | License plate | Volume [l] | Mileage [miles] |  |  |
|---|---|---|---|---|---|---|
| 210 { | 2011-01-04 | HD-LIC 1 | 48 | 3100 | 0 | -1 |
|  | 2011-01-06 | HD-LIC 7 | 50 | 3200 | 1 | -1 |
|  | 2011-01-07 | HD-LIC 3 | 51 | 3100 | 2 | -1 |
|  | 2011-01-10 | HD-LIC 4 | 49 | 3200 | 3 | -1 |
| 212 { | 2011-01-25 | HD-LIC 1 | 47 | 3612 | 4 | -1 |
|  | 2011-01-26 | HD-LIC 3 | 50 | 3709 | 5 | -1 |
|  | 2011-01-26 | HD-LIC 4 | 52 | 3599 | 6 | -1 |
|  | 2011-01-27 | HD-LIC 7 | 51 | 3780 | 7 | -1 |
| 214 { | 2011-02-03 | HD-LIC 7 | 49 | 4300 | 8 | 1 |
|  | 2011-02-04 | HD-LIC 1 | 48 | 4130 | 9 | 0 |
|  | 2011-02-06 | HD-LIC 4 | 50 | 3699 | 10 | 3 |
|  | 2011-02-07 | HD-LIC 3 | 52 | 4250 | 11 | 2 |
| 216 { | 2011-02-21 | HD-LIC 1 | 48 | 4700 | 12 | 4 |
|  | 2011-02-23 | HD-LIC 3 | 49 | 4750 | 13 | 5 |
|  | 2011-02-24 | HD-LIC 4 | 50 | 4100 | 14 | 6 |
|  | 2011-02-24 | HD-LIC 7 | 12 | 4400 | 15 | 7 |

Table 200 — with row groups 210, 212, 214, 216 — and array 430.

410

| Key Value | Head | Tail |
|---|---|---|
| HD-LIC 1 | 0 | 9 |
| HD-LIC 7 | 1 | 8 |
| HD-LIC 3 | 2 | 11 |
| HD-LIC 4 | 3 | 10 |

420

| Key Value | Head | Tail |
|---|---|---|
| HD-LIC 1 | 4 | 12 |
| HD-LIC 3 | 5 | 13 |
| HD-LIC 4 | 6 | 14 |
| HD-LIC 7 | 7 | 15 |

| Key Value | Head | Tail |
|---|---|---|
| HD-LIC 1 | 0 | 9 |
| HD-LIC 7 | 1 | 8 |
| HD-LIC 3 | 2 | 11 |
| HD-LIC 4 | 3 | 10 |

420

| Key Value | Head | Tail |
|---|---|---|
| HD-LIC 1 | 4 | 12 |
| HD-LIC 3 | 5 | 13 |
| HD-LIC 4 | 6 | 14 |
| HD-LIC 7 | 7 | 15 |

1010

| Key Value | Head | Tail |
|---|---|---|
| HD-LIC 1 | 0 | 9 |
|  |  |  |

1020

| Key Value | Head | Tail |
|---|---|---|
|  |  |  |
|  |  |  |

430

| | |
|---|---|
| 0 | -1 |
| 1 | -1 |
| 2 | -1 |
| 3 | -1 |
| 4 | -1 |
| 5 | -1 |
| 6 | -1 |
| 7 | -1 |
| 8 | 1 |
| 9 | 0 |
| 10 | 3 |
| 11 | 2 |
| 12 | 4 |
| 13 | 5 |
| 14 | 6 |
| 15 | 7 |

*FIG. 10*

| | 410 | |
|---|---|---|
| Key Value | Head | Tail |
| HD-LIC 1 | 0 | 9 |
| HD-LIC 7 | 1 | 8 |
| HD-LIC 3 | 2 | 11 |
| HD-LIC 4 | 3 | 10 |

| | 420 | |
|---|---|---|
| Key Value | Head | Tail |
| HD-LIC 1 | 4 | 12 |
| HD-LIC 3 | 5 | 13 |
| HD-LIC 4 | 6 | 14 |
| HD-LIC 7 | 7 | 15 |

| | 1010 | |
|---|---|---|
| Key Value | Head | Tail |
| HD-LIC 1 | 0 | 12 |
| | | |

| | 1020 | |
|---|---|---|
| Key Value | Head | Tail |
| | | |
| | | |

430

| Index | Value |
|---|---|
| 0 | -1 |
| 1 | -1 |
| 2 | -1 |
| 3 | -1 |
| 4 | 9 |
| 5 | -1 |
| 6 | -1 |
| 7 | -1 |
| 8 | 1 |
| 9 | 0 |
| 10 | 3 |
| 11 | 2 |
| 12 | 4 |
| 13 | 5 |
| 14 | 6 |
| 15 | 7 |

| Key Value | Head | Tail |
|---|---|---|
| HD-LIC 1 | 0 | 9 |
| HD-LIC 7 | 1 | 8 |
| HD-LIC 3 | 2 | 11 |
| HD-LIC 4 | 3 | 10 |

_420_

| Key Value | Head | Tail |
|---|---|---|
| HD-LIC 1 | 4 | 12 |
| HD-LIC 3 | 5 | 13 |
| HD-LIC 4 | 6 | 14 |
| HD-LIC 7 | 7 | 15 |

_1010_

| Key Value | Head | Tail |
|---|---|---|
| HD-LIC 1 | 0 | 12 |
| HD-LIC 7 | 1 | 15 |

_1020_

| Key Value | Head | Tail |
|---|---|---|
| HD-LIC 3 | 2 | 13 |
| HD-LIC 4 | 3 | 14 |

_430_

| | |
|---|---|
| 0 | -1 |
| 1 | -1 |
| 2 | -1 |
| 3 | -1 |
| 4 | 9 |
| 5 | 11 |
| 6 | 10 |
| 7 | 8 |
| 8 | 1 |
| 9 | 0 |
| 10 | 3 |
| 11 | 2 |
| 12 | 4 |
| 13 | 5 |
| 14 | 6 |
| 15 | 7 |

*FIG. 12*

PARALLEL SET AGGREGATION

CROSS REFERENCE TO RELATED APPLICATION

This application claims the benefit of and priority to U.S. Provisional Patent Application Ser. No. 61/639,251, filed Apr. 27, 2012, and which is incorporated herein by reference for all purposes.

BACKGROUND

A database may store data records including several data fields. It may be desirable to identify all data records in which a particular data field includes a particular value.

BRIEF DESCRIPTION OF THE DRAWINGS

FIG. 2 is a tabular representation of a portion of a database table according to some embodiments.

FIG. 4 illustrates processing unit dictionaries, corresponding table portions and a shared memory vector according to some embodiments.

FIG. 5 illustrates processing unit dictionaries, corresponding table portions and a shared memory vector according to some embodiments.

FIG. 6 illustrates processing unit dictionaries, corresponding table portions and a shared memory vector according to some embodiments.

FIG. 7 illustrates processing unit dictionaries, corresponding table portions and a shared memory vector according to some embodiments.

FIG. 8 illustrates processing unit dictionaries, corresponding table portions and a shared memory vector according to some embodiments.

FIG. 10 illustrates processing unit dictionaries, processing unit partitions and a shared memory vector according to some embodiments.

FIG. 11 illustrates processing unit dictionaries, processing unit partitions and a shared memory vector according to some embodiments.

FIG. 12 illustrates processing unit dictionaries, processing unit partitions and a shared memory vector according to some embodiments.

DETAILED DESCRIPTION

The following description is provided to enable any person in the art to make and use the described embodiments. Various modifications, however, will remain readily apparent to those in the art.

Figure 1:
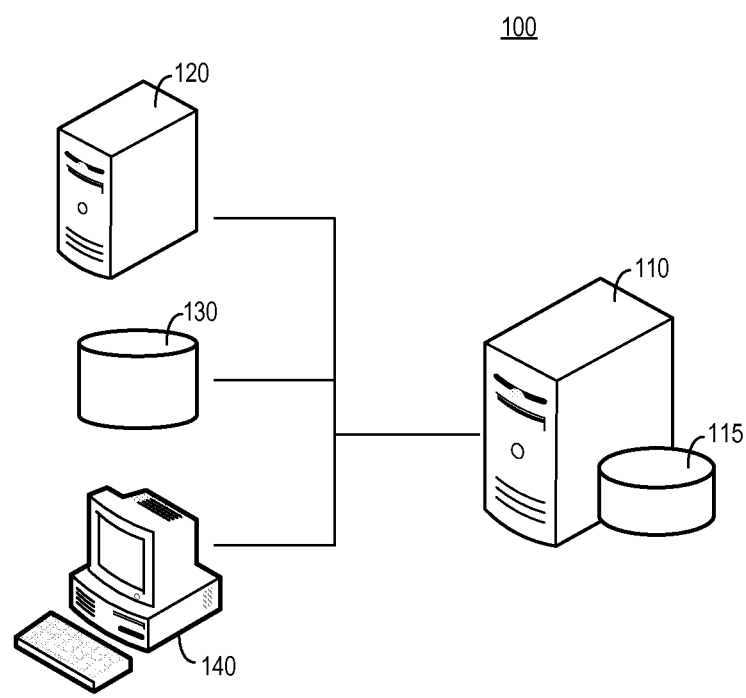
FIG. 1 is a block diagram of a system according to some embodiments.

FIG. 1 is a block diagram of system 100. Any of the depicted elements of system 100 may be implemented by one or more hardware devices coupled via any number of public and/or private networks. Two or more of such devices may be located remote from one another, and all devices may communicate with one another via any known manner of network(s) and/or via a dedicated connection. Embodiments are not limited to the architecture of system 100.

Server 110 may comprise a hardware server for managing data stored in database 115. In some embodiments, server 110 executes processor-executable program code of a database management system to store data to and retrieve data from database 115. Server 110 may provide alternative or additional services, including but not limited to the methods described herein, query processing, business applications, Web hosting, etc.

Database 115 may be implemented in Random Access Memory (e.g., cache memory for storing recently-used data) and one or more fixed disks (e.g., persistent memory for storing their respective portions of the full database). Alternatively, database 115 may implement an "in-memory" database, in which volatile (e.g., non-disk-based) memory (e.g., Random Access Memory) is used both for cache memory and for storing the full database. In some embodiments, the data of database 115 may comprise one or more of conventional tabular data, row-based data, column-based data, and object-based data. Database 115 may also or alternatively support multi-tenancy by providing multiple logical database systems which are programmatically isolated from one another.

According to system 100, server 110 may receive data from server 120, data warehouse 130 and desktop computer 140 for storage within database 115. Server 120, data warehouse 130 and desktop computer 140 are illustrated merely to provide examples of the type of systems from which server 110 may receive data. Generally, data may be received from any type of hardware over any one or more communication networks.

FIG. 2 includes a representation of table 200 for purposes of describing processes according to some embodiments. Each record of table 200 corresponds to a fuel purchase using a same credit card. After each purchase, a record is created including the date of the purchase, the license plate number of the vehicle for which the fuel was purchased, the volume of fuel purchased, and the odometer reading of the vehicle at the time of purchase. Of course, table 200 may include additional fields, including but not limited to a price paid and an identifier of the gas station at which the purchase was made. With reference to system 100, the data of table 200 may have been received by server 110 from any of devices 120-140 and stored in database 115 as illustrated in FIG. 2.

Some embodiments may operate to efficiently identify all records of table 200 which are associated with a particular license plate number. Some embodiments perform such identification using operations executed in parallel. Accordingly, some embodiments may be particularly suited for execution using multiple processing units. A processing unit as described herein may comprise any processing entity capable of operating in parallel with other processing entities. Examples of processing units include but are not limited to threads, processor cores, and processors.

Figure 3:
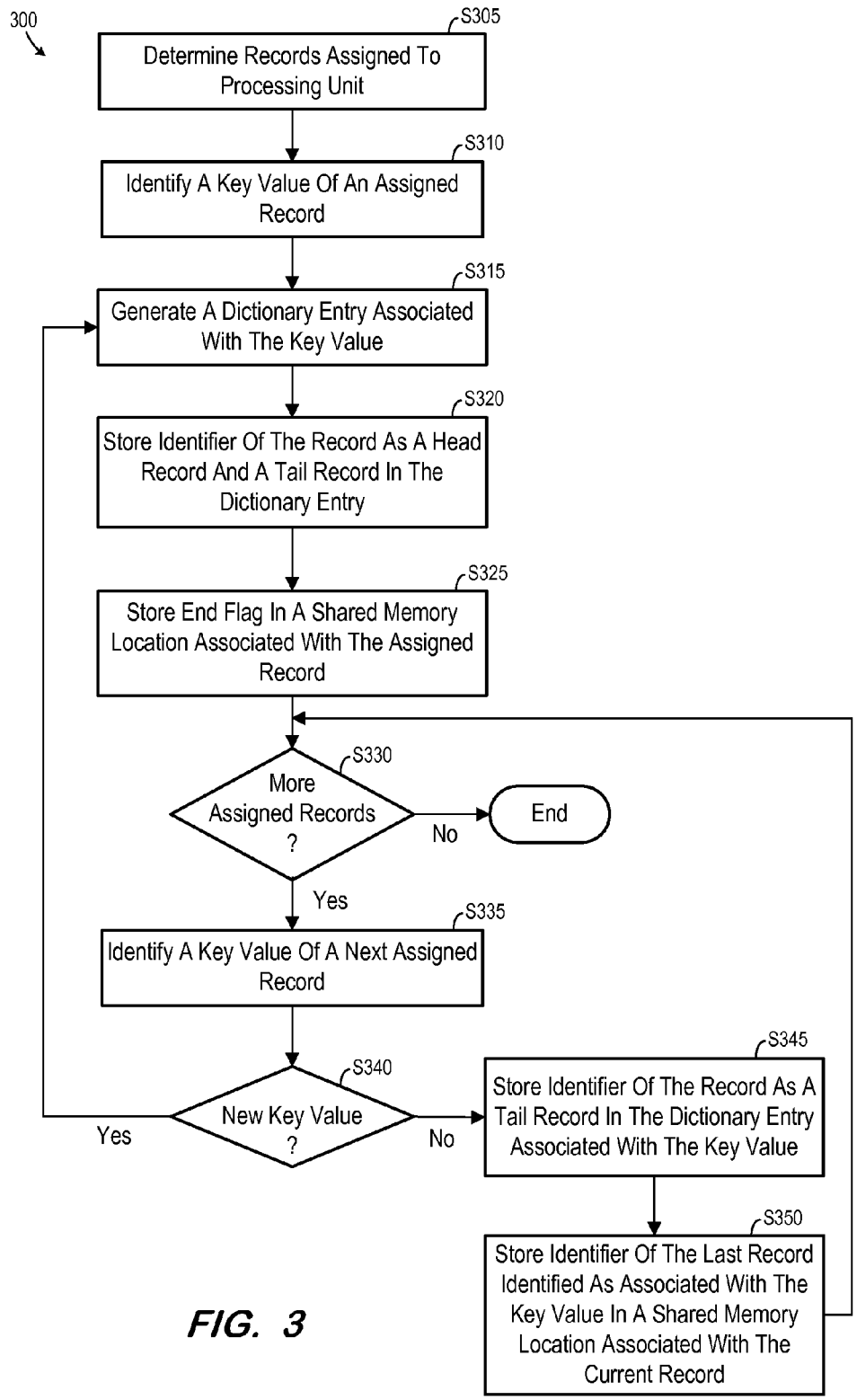
FIG. 3 is a flow diagram according to some embodiments.

FIG. 3 comprises a flow diagram of process 300 according to some embodiments. Process 300 may be executed by a processing unit of server 110 according to some embodiments. Process 300 and all other processes mentioned herein may be embodied in computer-executable program code read from one or more non-transitory computer-readable media, such as a floppy disk, a CD-ROM, a DVD-ROM, a Flash drive, a fixed disk and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to S305, various records of a database are assigned to respective ones of two or more processing units. For example, FIG. 4 shows a view of table 300, in which records 210 and 214 are assigned to Processor 1 and records 212 and 216 are assigned to Processor 2. Embodiments may employ any number of processors, blocks, blocks per processor, or rows per block.

As mentioned above, process 300 may be performed by a processing unit according to some embodiments. More specifically, and according to some embodiments, each employed processing unit executes process 300 independently and in parallel. As will be understood, such processing produces a final result more efficiently than prior systems.

Turning to S305, a processing unit determines the records which have been assigned to it. For example, Processor 1 determines records 210 and 214 at S305. Next, at S310, a key value of a first assigned record is identified. Continuing with the present example, Processor 1 identifies the key value HD-LIC 1 in the first record of assigned records 210.

A dictionary entry (e.g., a hash map) associated with the key value is generated at S315. For example, Processor 1 may generate dictionary 410 of FIG. 4, which initially includes a row corresponding to key value HD-LIC 1. Also shown in FIG. 4 is dictionary 420, associated with Processor 2.

An identifier of the first record is stored in the dictionary entry as a "head" record and as a "tail" record at S320. As will become evident, the dictionary entry is intended to reflect a linked list associated with its key value. FIG. 4 shows the record identifier "0" stored as a "head" record and as a "tail" record in the dictionary entry of dictionary 410 which is associated with the key value HD-LIC 1.

An end flag is then stored at S325 in a shared memory location associated with the identified record. In this regard, vector 430 is allocated in shared memory which is accessible to any processing unit. Vector 430 is the same size as table 200, i.e., each entry in vector 430 corresponds to one row of table 200. FIG. 4 illustrates the storage of such an end flag (i.e., "−1") in the location of vector 430 associated with the identified record.

Flow then proceeds to S330 to determine whether any additional assigned records are assigned to the present processing unit. If not, flow terminates. If so, a key value of a next assigned record is identified at S335.

At S340, it is determined whether the identified key value has been previously-identified during execution of process 300. If not, flow returns to S315 and continues as described above to generate a new dictionary entry, etc.

FIG. 5 illustrates generation of such a new entry of dictionary 410, due to the identification of key value HD-LIC 7 within the second record of records 210. FIG. 5 also illustrates the generation of dictionary entries due to simultaneous execution of process 300 by Processor 2 with respect to records 212 and 216. The end flag −1 has been stored in the shared memory locations of vector 430 associated with each processed record (i.e., records 0, 1, 4, 5) due to S325 as described above.

Flow cycles from S315 through S340 as long as each examined record includes a new key value. Continuing with the present example, FIG. 6 illustrates dictionary 410, dictionary 420, and vector 430 after each of Processors 1 and 2 has cycled from S315 through S340 four times to process records 210 and 212, respectively.

Flow continues from S340 to S345 if a key value identified at S335 is not a new key value. For example, upon encountering the first record of block 214, Processor 1 identifies key value HD-LIC 7, which was previously identified within the second record of block 210. Therefore, at S345, an identifier of the record is stored as the tail record in the dictionary entry of dictionary 410 associated with the key value HD-LIC 7.

FIG. 7 shows the new tail record identifier of the entry of dictionary 410. FIG. 7 also illustrates storage, at S350, of an identifier of the last record associated with the key value in a shared memory location associated with the current record. More specifically, record "1" was last-identified as associated with key value HD-LIC 7. Accordingly, the identifier "1" is stored in the location of vector 430 which is associated with the current record (i.e., the first record of block 214, or record "8").

Similarly, with respect to the contemporaneous processing of the first record of records 216 by Processor 2, a new tail record identifier (i.e., "12") is stored at S345 in the entry of dictionary 420 associated with key value HD-LIC 1, and the identifier "4" is stored at S350 in the location of vector 430 which is associated with the current record (i.e., the first record of block 212).

Flow returns from S350 to S330 and continues as described above until each assigned record has been evaluated. FIG. 8 illustrates dictionaries 410 and 420 and vector 430 after completion of process 300 by both Processor 1 and Processor 2.

As described above, more than one processing unit may perform process 300 in parallel with one another. Since Processor 1 and Processor 2 access different rows of table 200 and locations of vector 430, no locking protocol is necessary. In some embodiments, a processing unit may decide to replace its current dictionary by a new one, for example, when the current dictionary has exceeded its initial size.

Upon completion of the parallel executions of process 300, each dictionary row points to positions in vector 430 which correspond to a head record and a tail record of a linked list of records of table 200 which include the key value of the row. Using this structure, each processing unit can quickly collect all records of its blocks which are associated with a certain key value.

More particularly, a processing unit (e.g., Processor 1) identifies a row of its dictionary (e.g., dictionary 410) associated with the key value (e.g., HD-LIC 7), notes the position of vector 430 (i.e., 8) identified in the tail field of the dictionary row, obtains the record of table 200 located at that position, and reads the entry of vector 430 located at that position (i.e., 1) to identify the location of the prior record of table 200 in the linked list. This process continues until the read vector entry is −1, or some other flag, at which point it is determined that the linked list includes no more records.

Figure 9:
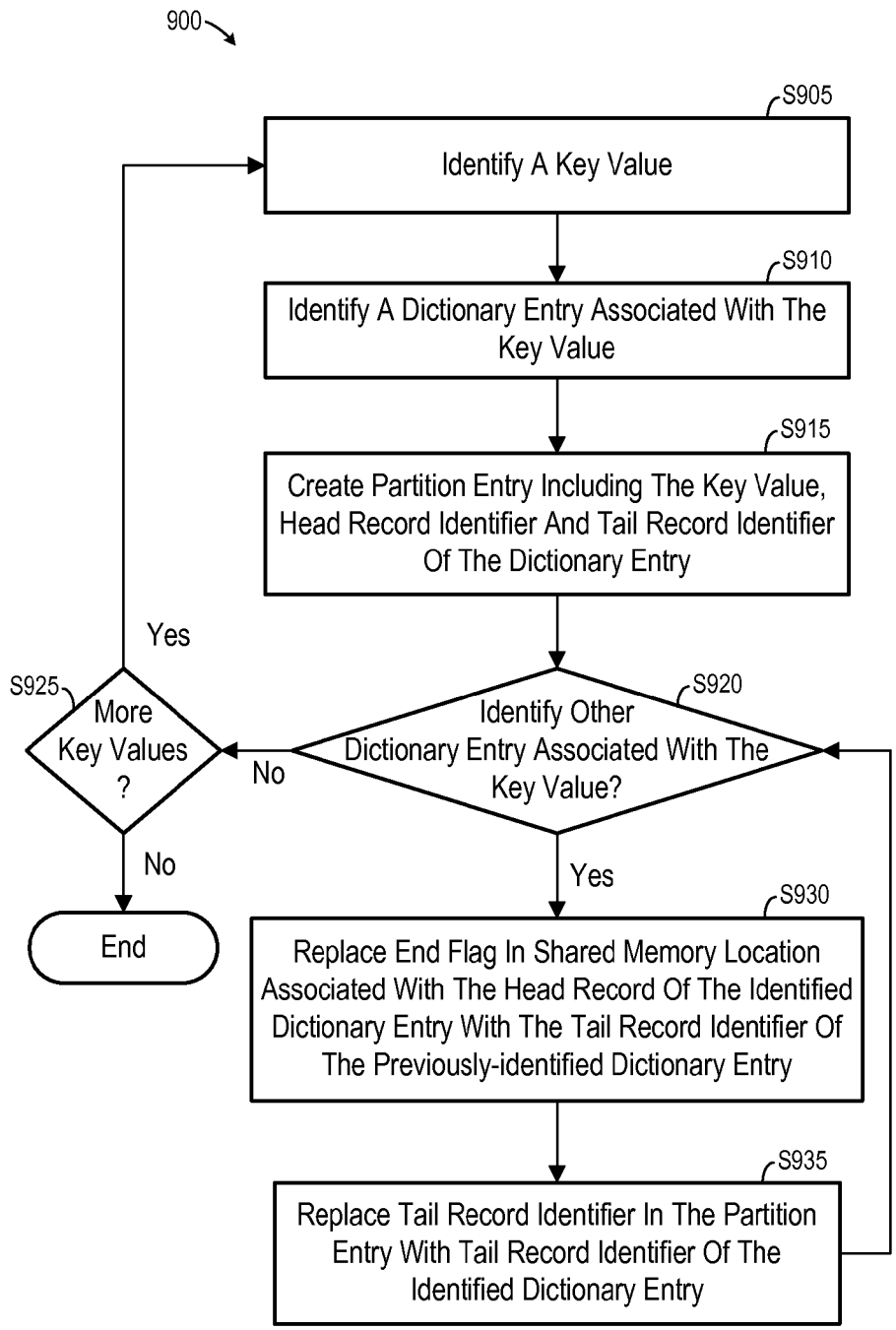
FIG. 9 is a flow diagram according to some embodiments.

According to some embodiments, the dictionaries are then partitioned according to their key values (e.g., using hash ranges) in order to create a single linked list for each key value. FIG. 9 is a flow diagram of process 900 to perform such partitioning. Again, process 900 may be performed by two or more processing units independently and in parallel.

FIG. 10 illustrates a portion of process 900 according to the prior example. For convenience, dictionaries 410 and 420 and vector 430 are reproduced as they appear in FIG. 8.

A key value is identified at S905, and a dictionary entry associated with the key value is identified at S910. A partition entry is then created at S915, including the key value as well as the head record identifier and the tail record identifier of the identified dictionary entry. Partition 1010 illustrates the creation of such an entry, based on key value HD-LIC 1 and its entry in dictionary 410.

At S920, it is determined whether any other entry of dictionaries 410 and 420 is associated with the current key value. In the present instance, flow proceeds to S930 because dictionary 420 includes an entry associated with key value HD-LIC 1.

The shared memory location associated with the head record of the identified dictionary entry is located at S930. In the present example, the head record of the identified dictionary entry is record 4, and the associated location of vector 430 is indicated by the numeral 4 adjacent to vector 430 in FIG. 10. The end flag (i.e., −1) in the shared memory location is replaced with the tail record identifier of the previously-identified dictionary entry. As mentioned above, the previously-identified dictionary entry includes the tail identifier "9".

FIG. 11 shows vector 430 after S930 as described above. Specifically, the end flag −1 stored in location 4 of vector 430 has been replaced by the number 9.

At S935, the tail record identifier of the created partition entry is replaced with the tail record identifier of the dictionary entry identified at S920. Again referring to FIG. 11, the tail record identifier 9 of the created entry of partition 1010 has been replaced by tail identifier 12 of the identified entry of dictionary 420.

Flow returns to S920 to determine if other dictionary entries exist associated with the key value. If so, flow continues as described above to alter vector 430 and to replace the tail record identifier of the partition entry associated with the key value. If not, flow proceeds to S925 to determine whether more key values exist.

FIG. 12 illustrates partitions 1010 and 1020 after execution of process 900 for each of the remaining three key values of dictionaries 910 and 920. Each of partitions 1010 and 1020 comprises a mutually-exclusive subset of key values, and, therefore forms an independent work package. Accordingly, one or more processors can be used to operate (e.g., in parallel) on these partitions. For example, using the combined linked lists defined by the partitions and vector 430, processing units can independently locate records associated with a certain key value and execute calculations on values stored in those records.

Processing units as described herein may be processors, processor cores, multi-core processors, etc. All of the processing units may access a main memory (i.e., a shared memory architecture). All of the processing units may be capable of executing the same program(s).

Some embodiments provide aggregation of records through allocation of one index-based memory structure (e.g., vector 430) and without the use of pointers. Moreover, some embodiments operate without a locking protocol because no two processing units will require access to a same memory location.

Figure 13:
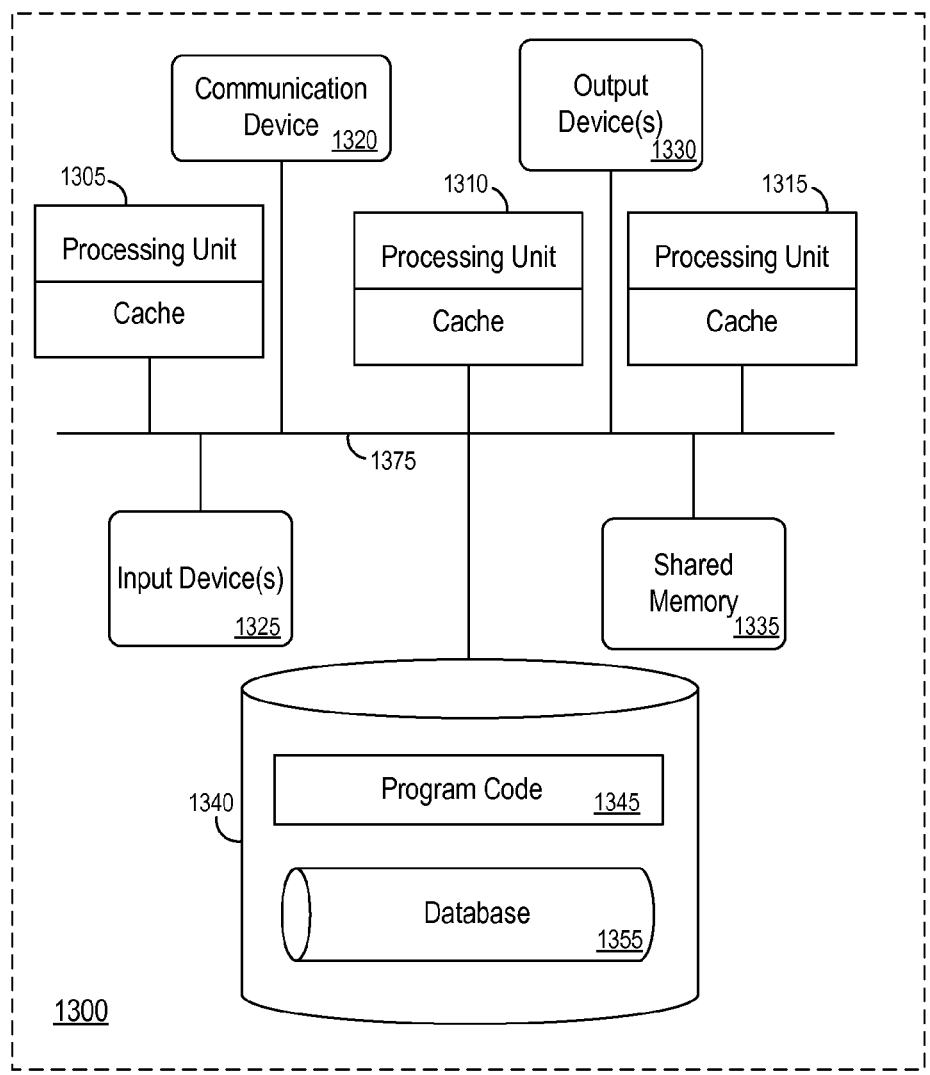
FIG. 13 is a block diagram of a hardware system according to some embodiments.

FIG. 13 is a block diagram of a computing device, system, or apparatus 1300 that may be operate as described above. System 1300 may include a plurality of processing units 1305, 1310, and 1315. The processing units may comprise one or more commercially available Central Processing Units (CPUs) in the form of one-chip microprocessors or multi-core processors. System 1300 may also include a local cache memory associated with each of the processing units 1305, 1310, and 1315 such as RAM memory modules.

Communication device 1320 may be used to communicate, for example, with one or more client devices or business service providers. System 1300 further includes an input device 1325 (e.g., a mouse and/or keyboard to enter content) and an output device 1330 (e.g., a computer monitor to display a user interface element).

Processing units 1305, 1310, and 1315 communicate with shared memory 1335 via system bus 1375. Shared memory 1335 may implement vector 430 according to some embodiments. System bus 1375 also provides a mechanism for the processing units to communicate with storage device 1340. Storage device 1340 may include any appropriate non-transitory information storage device, including combinations of magnetic storage devices (e.g., a hard disk drive), a CD-ROM, a DVD-ROM, a Flash drive, and/or semiconductor memory devices for storing data and programs.

Storage device 1340 may store processor-executable program code 1345 independently executable by processing units 1305, 1310, and 1315 to cause system 1300 to operate in accordance with any of the embodiments described herein. Program code 1345 and other instructions may be stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

In some embodiments, storage device 1340 includes database 1355 storing data as described herein. Database 1355 may include relational row-based data tables, column-based table, and other data structures (e.g., index hash tables) that are or become known.

System 1300 represents a logical architecture for describing some embodiments, and actual implementations may include more, fewer and/or different components arranged in any manner. The elements of system 1300 may represent software elements, hardware elements, or any combination thereof. For example, system 1300 may be implemented using any number of computing devices, and one or more processors within system 1300 may execute program code to cause corresponding computing devices to perform processes described herein.

Generally, each logical element described herein may be implemented by any number of devices coupled via any number of public and/or private networks. Two or more of such devices may be located remote from one another and may communicate with one another via any known manner of network(s) and/or via a dedicated connection.

Embodiments described herein are solely for the purpose of illustration. Those in the art will recognize other embodiments may be practiced with modifications and alterations to that described above.

What is claimed is:

1. A system comprising:
   a storage device storing a plurality of data records, each of the plurality of data records associated with one of a plurality of key values;
   a processor; and
   a memory storing processor-executable program code executable by the processor to cause the system to:
   determine a first plurality of the plurality of data records assigned to a first processing unit of the processor;
   identify, using the first processing unit, a first record of the first plurality of data records, the first record associated with a first key value;
   generate, using the first processing unit, a first dictionary entry of a first dictionary for the first key value;
   store, using the first processing unit, a first identifier of the first record as a tail identifier and as a head identifier in the first dictionary entry;
   store, using the first processing unit, an end flag in a first shared memory location, the first shared memory location associated with the first record and shared with a second processing unit of the processor;
   identify, using the first processing unit, a second record of the first plurality of data records, the second record associated with the first key value;
   replace, using the first processing unit, the tail identifier in the first dictionary entry with a second identifier of the second record;

store, using the first processing unit, the first identifier in a second shared memory location, the second shared memory location associated with the second record and shared with the second processing unit;

determine, using the second processing unit, a second plurality of the plurality of data records assigned to the second processing unit;

identify, using the second processing unit, a third record of the second plurality of data records, the third record associated with the first key value;

generate, using the second processing unit, a second dictionary entry of a second dictionary for the first key value;

store, using the second processing unit, a third identifier of the third record of the second plurality of data records as a second tail identifier and as a second head identifier in the second dictionary entry;

store, using the second processing unit, a second end flag in a third shared memory location, the third shared memory location associated with the third record and shared with the first processing unit;

identify, using the second processing unit, a fourth record of the first plurality of data records, the fourth record associated with the first key value;

replace, using the second processing unit, the second tail identifier in the second dictionary entry with a fourth identifier of the fourth record; and store, using the second processing unit, the third identifier in a fourth shared memory location, the fourth shared memory location associated with the fourth record and shared with the first processing unit.

2. A system according to claim 1, the processor-executable program code further executable by the processor to cause the system to:

identify, using the first processing unit, a third record of the first plurality of data records, the third record associated with the first key value;

replace, using the first processing unit, the tail identifier in the first dictionary entry with an identifier of the third record of the first plurality of data records; and store, using the first processing unit, the second identifier in a third shared memory location, the third shared memory location associated with the third record and shared with the second processing unit.

3. A system according to claim 1, the processor-executable program code further executable by the processor to cause the system to:

identify, using the first processing unit, a third record of the first plurality of data records, the third record associated with a second key value;

generate, using the first processing unit, a second dictionary entry of the first dictionary for the second key value;

store, using the first processing unit, an identifier of the third record of the first plurality of data records as a third tail identifier and as a third head identifier in the second dictionary entry of the first dictionary;

store, using the first processing unit, a third end flag in a third shared memory location, the third shared memory location associated with the third record and shared with the second processing unit;

identify, using the first processing unit, a fourth record of the first plurality of data records, the fourth record of the first plurality of data records associated with the second key value;

replace, using the first processing unit, the third tail identifier in the second dictionary entry of the first dictionary with a fourth identifier of the fourth record of the first plurality of data records; and store, using the first processing unit, the identifier of the third record of the first plurality of data records in a fourth shared memory location, the fourth shared memory location associated with the fourth record and shared with the second processing unit.

4. A system according to claim 3, the processor-executable program code further executable by the processor to cause the system to:

identify, using the first processing unit, a fifth record of the first plurality of data records, the fifth record associated with the second key value;

replace, using the first processing unit, the tail identifier in the second dictionary entry with a fifth identifier of the fifth record; and store, using the first processing unit, the fourth identifier in a fifth shared memory location, the fifth shared memory location associated with the fifth record and shared with the second processing unit.

5. A system according to claim 1, wherein the first processing unit is a first processor core of the processor, and the second processing unit is a second processor core of the processor.

6. A method for a plurality of data records, each of the plurality of data records associated with one of a plurality of key values, the method implemented by a computing system in response to execution of program code by a processor of the computing system, the method comprising:

determining a first plurality of the plurality of data records assigned to a first processing unit of the processor;

identifying, a first record of the first plurality of data records, the first record associated with a first key value;

generating, using the first processing unit, a first dictionary entry of a first dictionary for the first key value;

storing, using the first processing unit, a first identifier of the first record as a tail identifier and as a head identifier in the first dictionary entry;

storing, using the first processing unit, an end flag in a first shared memory location, the first shared memory location associated with the first record and shared with a second processing unit of the processor;

identifying, a second record of the first plurality of data records, the second record associated with the first key value;

replacing, using the first processing unit, the tail identifier in the first dictionary entry with a second identifier of the second record;

storing, using the first processing unit, the first identifier in a second shared memory location, the second shared memory location associated with the second record and shared with the second processing unit;

determining, using the second processing unit, a second plurality of the plurality of data records assigned to the second processing unit;

identifying, using the second processing unit, a third record of the second plurality of data records, the third record associated with the first key value;

generating, using the second processing unit, a second dictionary entry of a second dictionary for the first key value;

storing, using the second processing unit, a third identifier of the third record of the second plurality of data records as a second tail identifier and as a second head identifier in the second dictionary entry;

storing, using the second processing unit, a second end flag in a third shared memory location, the third shared memory location associated with the third record and shared with the first processing unit;

identifying, using the second processing unit, a fourth record of the first plurality of data records, the fourth record associated with the first key value;

replacing, using the second processing unit, the second tail identifier in the second dictionary entry with a fourth identifier of the fourth record; and storing, using the second processing unit, the third identifier in a fourth shared memory location, the fourth shared memory location associated with the fourth record and shared with the first processing unit.

7. A method according to claim 6, further comprising:

identifying, using the first processing unit, a third record of the first plurality of data records, the third record associated with the first key value;

replacing, using the first processing unit, the tail identifier in the first dictionary entry with an identifier of the third record of the first plurality of data records; and storing, using the first processing unit, the second identifier in a third shared memory location, the third shared memory location associated with the third record and shared with the second processing unit.

8. A method according to claim 6, further comprising:

identifying, using the first processing unit, a third record of the first plurality of data records, the third record associated with a second key value;

generating, using the first processing unit, a second dictionary entry of the first dictionary for the second key value;

storing, using the first processing unit, an identifier of the third record of the first plurality of data records as a third tail identifier and as a third head identifier in the second dictionary entry of the first dictionary;

storing, using the first processing unit, a third end flag in a third shared memory location, the third shared memory location associated with the third record and shared with the second processing unit;

identifying, a fourth record of the first plurality of data records, the fourth record of the first plurality of data records associated with the second key value;

replacing, using the first processing unit, the third tail identifier in the second dictionary entry of the first dictionary with a fourth identifier of the fourth record of the first plurality of data records; and storing, using the first processing unit, the identifier of the third record of the first plurality of data records in a fourth shared memory location, the fourth shared memory location associated with the fourth record and shared with the second processing unit.

9. A method according to claim 8, further comprising:

identifying, using the first processing unit, a fifth record of the first plurality of data records, the fifth record associated with the second key value;

replacing, using the first processing unit, the tail identifier in the second dictionary entry with a fifth identifier of the fifth record; and storing, using the first processing unit, the fourth identifier in a fifth shared memory location, the fifth shared memory location associated with the fifth record and shared with the second processing unit.

10. A method according to claim 6, wherein the first processing unit is a first processor core, and the second processing unit is a second processor core.

11. A non-transitory medium storing computer-executable program code, the program code executable by a computing device to:

determine a first plurality of the plurality of data records assigned to a first processing unit;

identify, using the first processing unit, a first record of the first plurality of data records, the first record associated with a first key value;

generate, using the first processing unit, a first dictionary entry of a first dictionary for the first key value;

store, using the first processing unit, a first identifier of the first record as a tail identifier and as a head identifier in the first dictionary entry;

store, using the first processing unit, an end flag in a first shared memory location, the first shared memory location associated with the first record and shared with a second processing unit;

identify, using the first processing unit, a second record of the first plurality of data records, the second record associated with the first key value;

replace, using the first processing unit, the tail identifier in the first dictionary entry with a second identifier of the second record;

store, using the first processing unit, the first identifier in a second shared memory location, the second shared memory location associated with the second record and shared with a second processing unit;

determine, using the second processing unit, a second plurality of the plurality of data records assigned to the second processing unit;

identify, using the second processing unit, a third record of the second plurality of data records, the third record associated with the first key value;

generate, using the second processing unit, a second dictionary entry of a second dictionary for the first key value;

store, using the second processing unit, a third identifier of the third record of the second plurality of data records as a second tail identifier and as a second head identifier in the second dictionary entry;

store, using the second processing unit, a second end flag in a third shared memory location, the third shared memory location associated with the third record and shared with the first processing unit;

identify, using the second processing unit, a fourth record of the first plurality of data records, the fourth record associated with the first key value;

replace, using the second processing unit, the second tail identifier in the second dictionary entry with a fourth identifier of the fourth record; and store, using the second processing unit, the third identifier in a fourth shared memory location, the fourth shared memory location associated with the fourth record and shared with the first processing unit.

12. A medium according to claim 11, the program code further executable by a computing device to:

identify, using the first processing unit, a third record of the first plurality of data records, the third record associated with the first key value;

replace, using the first processing unit, the tail identifier in the first dictionary entry with a third identifier of the third record of the first plurality of data records; and store, using the first processing unit, the second identifier in a third shared memory location, the third shared memory location associated with the third record and shared with the second processing unit.

13. A medium according to claim 11, the program code further executable by a computing device to:

identify, using the first processing unit, a third record of the first plurality of data records, the third record associated with a second key value;

generate, using the first processing unit, a second dictionary entry of the first dictionary for the second key value;

store, using the first processing unit, an identifier of the third record of the first plurality of data records as a third tail identifier and as a third head identifier in the second dictionary entry of the first dictionary;

store, using the first processing unit, a third end flag in a third shared memory location, the third shared memory location associated with the third record and shared with the second processing unit;

identify, using the first processing unit, a fourth record of the first plurality of data records, the fourth record of the first plurality of data records associated with the second key value;

replace, using the first processing unit, the third tail identifier in the second dictionary entry of the first dictionary with a fourth identifier of the fourth record of the first plurality of data records; and store, using the first processing unit, the identifier of the third record of the first plurality of data records in a fourth shared memory location, the fourth shared memory location associated with the fourth record and shared with the second processing unit.

14. A medium according to claim 13, the program code further executable by a computing device to:

identify, using the first processing unit, a fifth record of the first plurality of data records, the fifth record associated with the second key value;

replace, using the first processing unit, the tail identifier in the second dictionary entry with a fifth identifier of the fifth record; and store, using the first processing unit, the fourth identifier in a fifth shared memory location, the fifth shared memory location associated with the fifth record and shared with the second processing unit.

15. A medium according to claim 11, wherein the first processing unit is a first processor core, and the second processing unit is a second processor core.

16. A medium according to claim 11, wherein the first processing unit is a first processor, and the second processing unit is a second processor.

* * * * *